(No Model.) W. H. FAUBER. 6 Sheets—Sheet 1.
CHAIR.
No. 508,690. Patented Nov. 14, 1893.
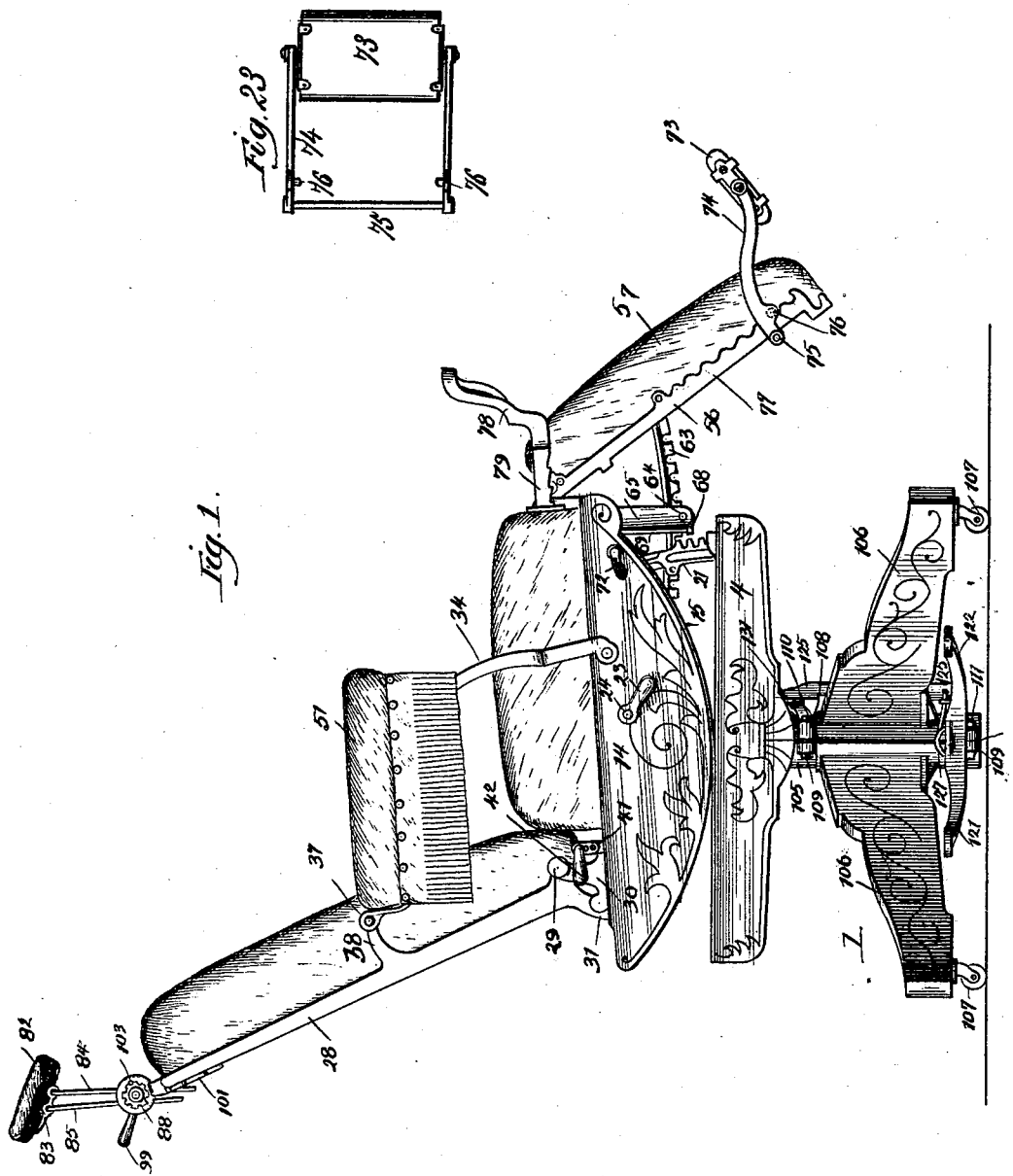

(No Model.)
W. H. FAUBER.
CHAIR.
No. 508,690.
6 Sheets—Sheet 2.
Patented Nov. 14, 1893.
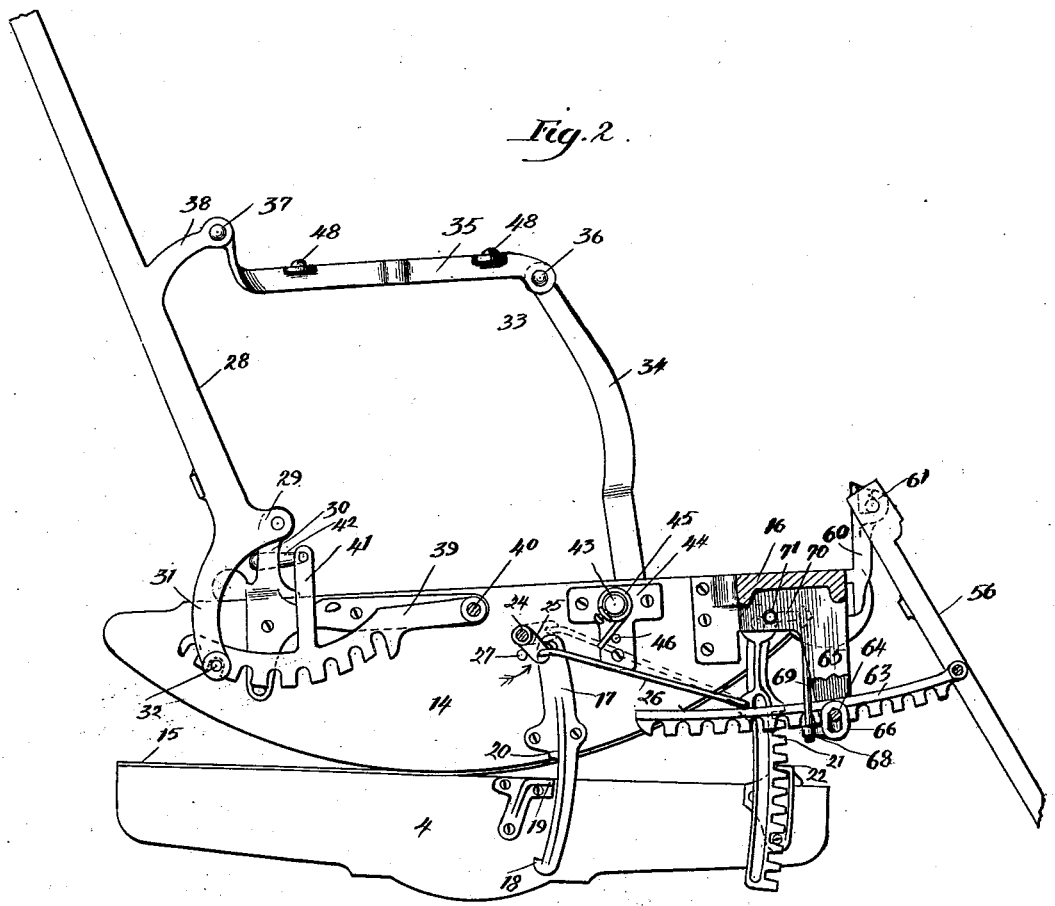
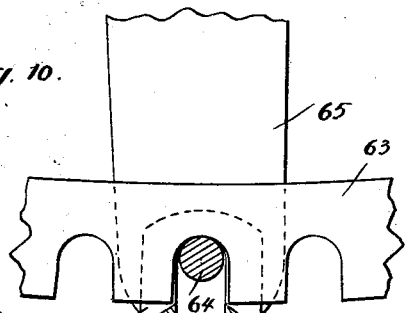
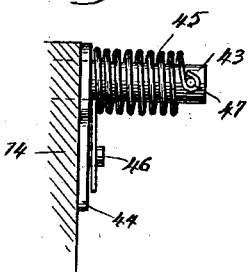

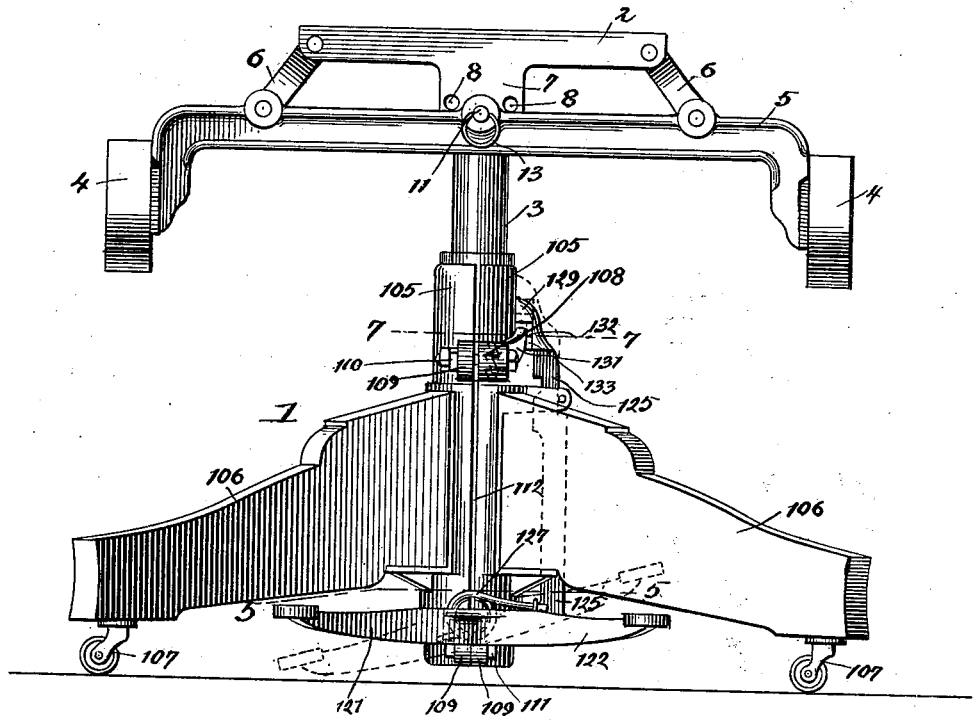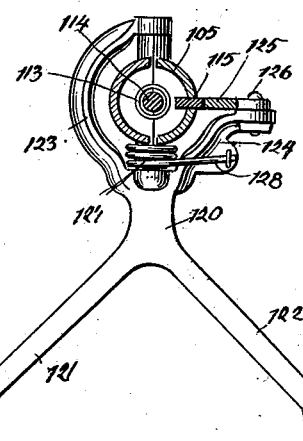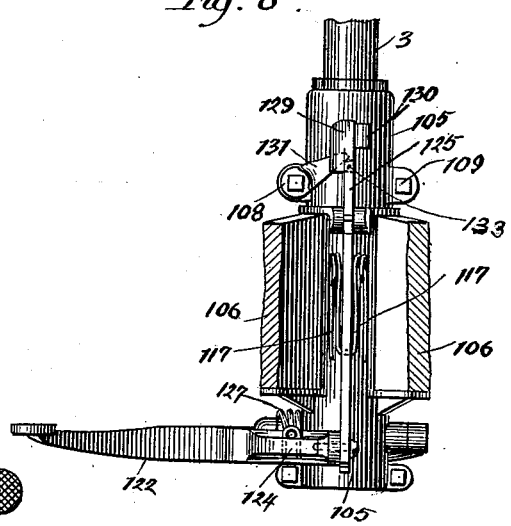

(No Model.) 6 Sheets—Sheet 4.
W. H. FAUBER.
CHAIR.
No. 508,690. Patented Nov. 14, 1893.
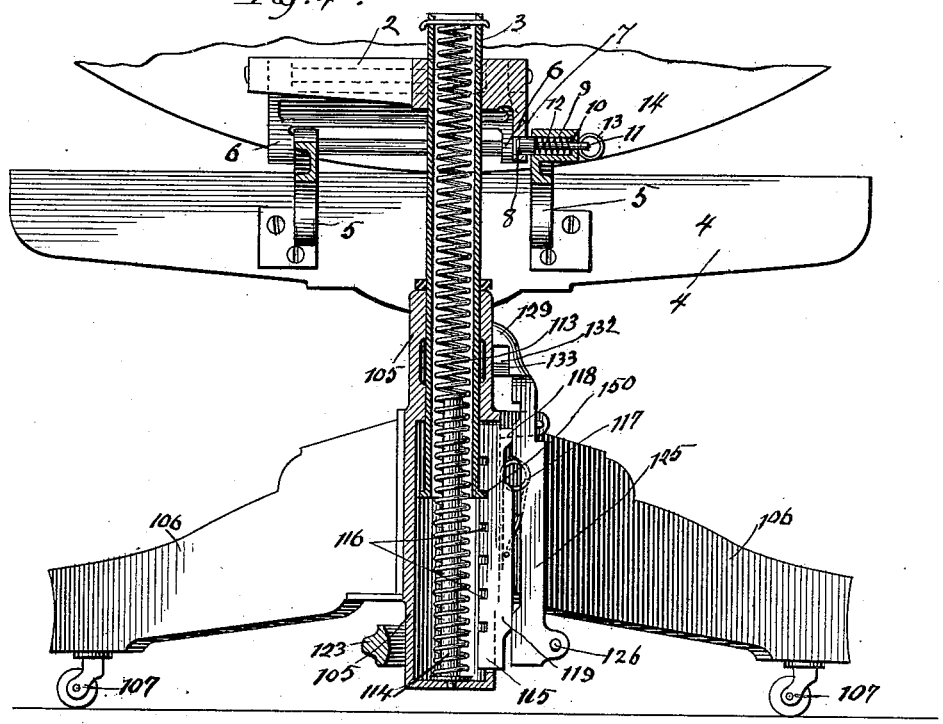
Witnesses:
Frank J Blanchard
H. B. Hallock
Inventor:
William H. Fauber
By Bond Adams & Pickard
Attorneys.

(No Model.)　　　　　W. H. FAUBER.　　　6 Sheets—Sheet 5.
CHAIR.
No. 508,690.　　　　　　　　Patented Nov. 14, 1893.
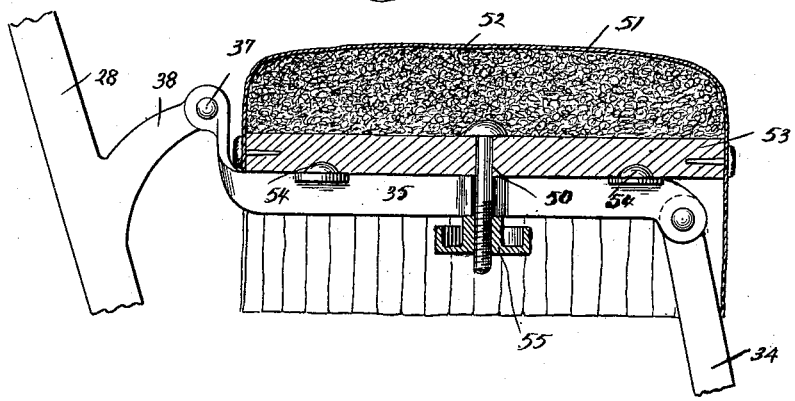
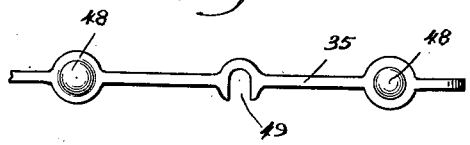
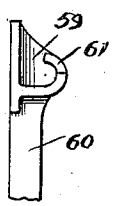
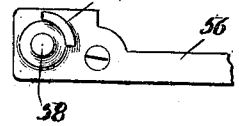
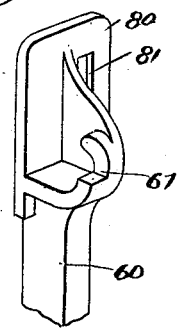
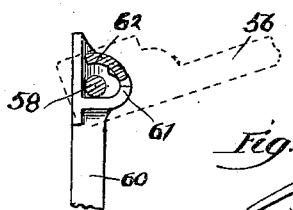
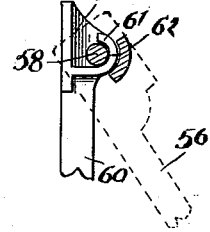
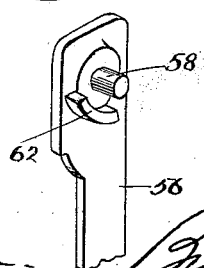
Witnesses:
H. B. Hallock.
John L. Jackson.
Inventor:
William H. Fauber
By Pond Adams Pickard
Attorneys
THE NATIONAL LITHOGRAPHING COMPANY,
WASHINGTON, D. C.

(No Model.) W. H. FAUBER. 6 Sheets—Sheet 6.
CHAIR.
No. 508,690. Patented Nov. 14, 1893.
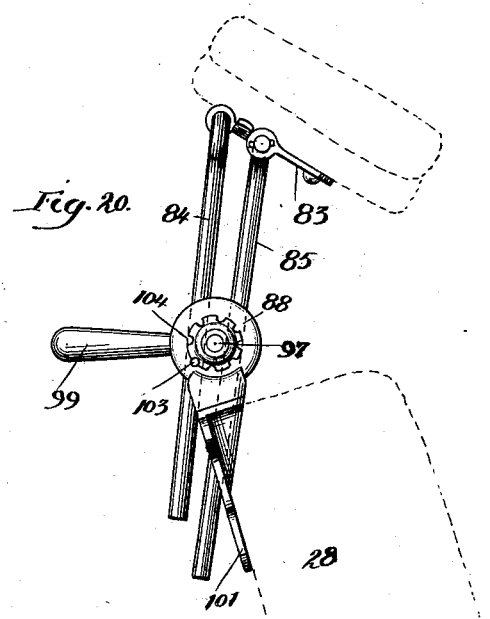
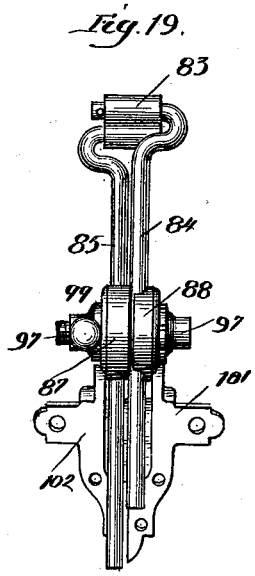
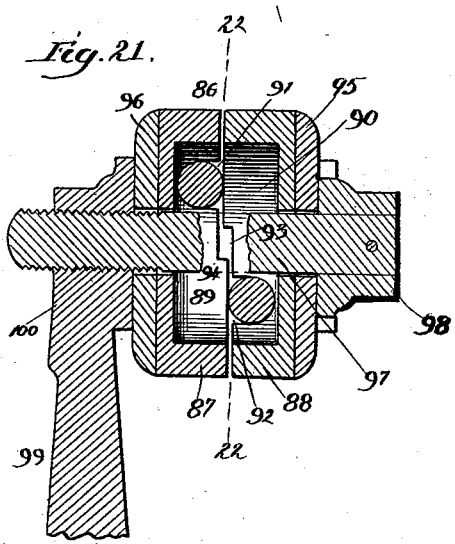
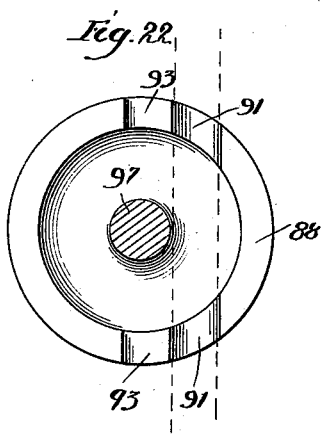
Witnesses
H. B. Hallock
John L. Jackson
Inventor
William H. Fauber
By Bond Adams Pickard
Attorneys

UNITED STATES PATENT OFFICE.

WILLIAM H. FAUBER, OF CHICAGO, ILLINOIS.

CHAIR.

SPECIFICATION forming part of Letters Patent No. 508,690, dated November 14, 1893.

Application filed April 7, 1892. Serial No. 428,207. (No model.)

*To all whom it may concern:*

Be it known that I, WILLIAM H. FAUBER, a citizen of the United States, residing at Chicago, in the county of Cook and State of Illinois, have invented certain new and useful Improvements in Chairs, of which the following is a specification, reference being had to the accompanying drawings, in which—

Figure 1 is a side elevation. Fig. 2 is a longitudinal vertical section of the upper portion of the chair, showing the different locking devices and method of operating them. Fig. 3 is a detail, being a rear elevation of the chair support or base. Fig. 4 is a central vertical section of the chair support or base. Fig. 5 is a detail, being a cross section on line 5—5 of Fig. 3. Fig. 6 is a detail, being a side elevation of one side of the central support for the chair, part of the legs being removed. Fig. 7 is a detail, being a cross section on line 7—7 of Fig. 3. Fig. 8 is a detail, being a side elevation of the device for locking the supporting shaft against rotary motion, showing the shaft locked. Fig. 9 is an enlarged detail, being a central longitudinal vertical section of one of the arms, showing the arm rests. Fig. 10 is an enlarged detail, being a partial sectional view of the lock which controls the adjustment of the foot stool. Fig. 11 is an enlarged detail, being a cross section of a portion of the rocker, showing one of the back-supporting springs. Fig. 12 is a detail, being a top or plan view of one of the arms. Fig. 13 is a detail, being a side elevation of one of the sockets which receives one of the foot stool pivots. Fig. 14 is a side elevation of one of the foot stool pivots. Fig. 15 is a perspective view of one of the foot stool pivots. Fig. 16 is a side elevation of one of the sockets for receiving the foot stool pivots, showing the method of inserting the pivot in the socket. Fig. 17 is a similar view, showing the position of the foot stool pivot after it has been placed in the socket. Fig. 18 is a detail, being a perspective view of one of the brackets which support the foot rests or stirrups. Fig. 19 is a rear elevation of the devices for supporting the head rest. Fig. 20 is a side elevation of the same. Fig. 21 is a central horizontal section of a portion of the device for supporting the head rest, showing the method of locking the supporting rods; and Fig. 22 is a central vertical section on line 22—22 of Fig. 21. Fig. 23 is a top view of the foot rest frame.

My invention relates to chairs, and more particularly to adjustable chairs adapted to be used for surgical purposes.

The objects of my invention are, first, to provide an adjustable chair, the seat of which may be easily raised or lowered on its base; second, to provide improved locking devices by means of which the chair seat may be locked at any desired height, and at any point of its revolution; third, to provide improved devices for laterally tilting the chair and securing it at any desired angle of inclination; fourth, to provide a new and improved foot rest and means for adjusting the same; fifth, to provide new and improved means for supporting the head rest; and to otherwise improve the construction and operation of chairs of this class. I accomplish these objects as hereinafter specified and as illustrated in the drawings.

That which I regard as new will be pointed out in the claims.

In the drawings,—1, indicates the chair base.

2, indicates a supporting frame, which is mounted on a perpendicular tubular shaft 3, and is firmly secured at its center to the shaft, near the top.

4, 4, indicate the side bars of the frame adapted to support the chair seat.

5, 5, indicate transverse bars of the supporting frame, which are secured to the inner sides of the side bars 4, as shown in Fig. 3.

The side bars 4 and transverse bars 5 together form a rectangular base for supporting the chair rocker. The transverse bars 5 are pivotally connected to and swing from the frame 2 by means of rectangular links 6, one at each end of the frame 2, which links are pivoted to the sides of the frame 2 and to the transverse bars 5 in such manner that the upper part of the links 6 will incline toward each other when the transverse bars 5 are in a horizontal position, as best shown in Fig. 3. By this construction, the transverse bars 5 and side rails 4 may be swung at an angle to the frame 2 and into an inclined position on either side of the frame. To lock the bars 5 at an angle to the frame 2, one of the end bars of the frame 2 is provided, at or near its center, with a depending tongue or arm 7, which extends to a short distance below the upper surface of the transverse bars 5, and is parallel with and adjacent to one of the bars 5. The arm or tongue 7 is provided near its lower edge with a number of holes or eyes 8, formed in the arc of a circle, and adapted to register, when the bar 5 is at various angles of inclination to the frame 2, with an eye 9 in the transverse bar 5 which is adjacent to the tongue 7. The eye 9 is provided with a flange 10 on its outer end, as best shown in Fig. 4.

11, indicates a locking bolt or pin, which is fitted in the eye 9 in the transverse bar 5, and is adapted to enter any one of the eyes 8 in the tongue 7. The pin 11 is provided with a spring 12 fitted in the eye 9, and adapted to hold the pin 11 at its innermost point, as best shown in Fig. 4. The pin 11 may be drawn outward by means of a ring 13 attached to its outer end, or by any other suitable device. By drawing out the pin 11 from the eye 8 in which it is inserted, the transverse bars 5 and the supporting frame 4 of the chair, may be swung at an angle to the frame 2, throwing the eye 9 around to a point opposite another of the eyes 8, when the bars 5 and 4 may be locked in such inclined position by means of the pin 11, as above described.

14, indicates rockers for the chair, which are of usual construction, and are mounted upon the side bars 4, as best shown in Figs. 1 and 2.

15, indicates straps which are preferably connected at their forward ends to the rockers 14 and at their rear ends to the rear ends of the side bars 4, as best shown in Fig. 2.

The rockers 14 are secured together by a cross bar 16, located at their forward ends, as best shown in Fig. 2. If desired, other strengthening braces may be provided also. By the construction shown, the rockers 14 will be adapted to rock upon the side bars 4 in the usual manner. In order to limit the backward and forward motion of the rockers, a bar 17 is attached to each rocker, as best shown in Fig. 2, which bar is provided with a projecting point 18 adapted to engage a stop 19 suitably secured on the side bar 4. The bar 17 is sufficiently curved to permit of the rocking of the rockers 14, and is also provided with a stop 20, adapted, when the rocker is rocked forward, to engage the upper portion of the stop 19 to limit the forward rocking. By this construction the rockers are prevented from rocking too far in either direction. Instead of providing each rocker with a bar 17, a single one may be used if desired, as the operation would be substantially the same.

In chairs of this class it is desirable that means should be provided for locking the rocker at any desired inclination to its support. To accomplish such object I provide a rack 21, which at its upper end is pivoted to one of the rockers 14, preferably at the forward end, and on the inside of the rocker, as best shown in Fig. 2. The teeth of the rack 21 are adapted to engage a fixed stop 22 which is secured in a suitable manner upon one of the side bars 4, as best shown in Fig. 2.

23, indicates a lever for operating the rack 21, which lever is mounted upon a shaft 24 mounted in one of the rockers 14, as best shown in Figs. 1 and 2. The shaft 24 passes through the rocker 14 and is provided on its inner end with a lever 25 which projects forward and is connected by means of a connecting rod 26 to the rack 21. By lifting the lever 23, the lever 25 will be turned in a direction indicated by the arrow in Fig. 2, and the connecting bar will thereby be drawn backward, throwing the rack 21 out of engagement with the stop 22, permitting the rocker to rock. The length of the rod 26 is so adjusted that when the lever 23 is turned downward, the rack will be thrown into engagement with the stop 22. It is evident that instead of locating the rack 21 at the front of the rocker, as shown, it might be located at the rear and the lever 25 correspondingly arranged, so that it could be operated in substantially the same manner; and I do not wish to limit myself to locating the rack 21 at the forward end of the rocker or at any particular point.

27, indicates a stop adapted to engage the lever 25 to limit its downward motion.

28, indicates the back of the chair, the frame of which is provided at each side near its lower end with a lug 29, by means of which the back is pivoted to brackets 30, one of which is rigidly attached to each rocker 14 near its rear end, as best shown in Fig. 2. The frame 28 is provided at one side with a depending portion 31, which is curved as shown, and is provided with a pin 32 passing transversely through it and projecting a short distance beyond it, for purposes which will be hereinafter described.

33, indicates the arms of the chair, each of which consists of an upwardly extending portion 34 and a horizontal portion 35, as best shown in Fig. 2. The portions 34 and 35 are pivoted together by means of a pivot 36, and the portion 35 is pivotally connected by means of a pivot 37 to a projecting lug 38, suitably placed on the frame of the back 28. Instead of pivoting the horizontal portion 35 to the lug 38, as shown, it may be pivoted directly to the frame of the back.

39, indicates a convex rack, which is pivotally mounted upon one of the rockers 14, by means of a pivot 40, as best shown in Fig. 2, and extends rearward upon said rocker. 41, indicates a lever which projects upward from said rack 39, and is preferably formed integral therewith. The lever 41 is provided with a handle 42 which is suitably connected to said lever and is located at the outside of the rocker 14, as best shown in Fig. 1. The construction is such that the lever 41 may be raised by means of the handle 42 to lift the rack 39. The rack 39 is so located that its teeth will engage the pin 32 carried by the depending portion 31 of the back frame. By this construction, by raising the lever 41, the back may be moved to any desired inclination and then locked at such inclination by means of the rack 39 and pin 32.

The lower end of each portion 34 of the arms 33 is rigidly connected to a horizontal pin 43, which pins 43 are mounted in suitable bearings 44 formed in the rockers 14, as best shown in Figs. 2 and 11.

45, indicates a spring, one of which is mounted upon each pin 43, as shown in Fig. 11.

46, indicates a lug against which bears one of the ends of the spring 45, the other end of the spring being secured to a pin 47 mounted upon the pin 43, as shown. The arrangement of the spring 45 is such that when the portion 34 of the arm 33 is moved backward, the spring will be tightened and its tension thereby increased. By this construction the tension of the spring will act to overcome a portion of the weight of the back and correspondingly diminish the force necessary to move the back forward.

The horizontal portions 35 of the arms 33 are each provided with lugs or pins 48, located on the upper surfaces near each end, as best shown in Fig. 12, and are also provided with a recess 49, preferably located at the center, which recesses are adapted to receive bolts 50, as best shown in Fig. 9.

51, indicates an arm rest, one of which is mounted upon each portion 35 of the chair arms, as shown in Fig. 9. The arm rests preferably consist of an upholstered portion 52, mounted upon a wooden or other suitable base 53, as shown in Fig. 9.

54, indicates recesses formed in the lower portion of the base 53 of the arm rests, which recesses are adapted to fit upon the projections 48 of the arms, as shown. The bolt 50 passes through the base 53 and is secured in place by means of a nut 55, which is screwed onto it below the portion 35, as best shown in Fig. 9. By this means the arm rests may be readily removed when desired.

56, indicates the frame of a foot rest, which is preferably adapted to receive suitable upholstering 57. The frame 56 is provided at each side and at the upper end with pins 58, which project therefrom, as best shown in Fig. 15. The pins 58 are adapted to fit into sockets 59 formed in the upper end and on the inside of brackets 60 which are secured at the front end of the cross bar 16, as best shown in Fig. 2. Each socket 59 is provided at its forward end with an upwardly curved flange 61, as best shown in Fig. 18.

62, indicates curved lugs, one of which is formed on each side piece of the foot rest frame 56 a short distance from the pins 58, as best shown in Figs. 14 and 15. The lugs 62 are placed at such a distance from the pins 58 that the flanges 61 may pass between the pins 58 and the lugs 62, as best shown in Fig. 17, and they are so placed that it will be necessary to turn the foot rest 56 to an extraordinarily high position in order to permit of the pivots 58 being inserted in the sockets 59, as indicated by dotted lines in Fig. 16. The length and curvature of the flanges 61 also determine to a certain extent the height to which the foot rest must be raised in order to insert the pivots 58 in the sockets 59. By this construction the pivots of the foot rest cannot work loose and are securely held in their sockets.

To provide for the adjustment of the foot rest, a rack 63 is provided, which at its forward end is pivotally connected to the under side of the foot rest frame 56, preferably at the center. The rack 63 passes over a horizontal pin 64, which is supported by brackets 65 depending from and rigidly secured to the cross bar 16, as best shown in Fig. 2. The brackets 65 are preferably located close together, only sufficient space being left between them to permit of the free working of the rack 63.

66, indicates a link, which is mounted upon the pin 64 and is provided with a recess 67, of sufficient width to receive the rack 63, as best shown in Fig. 10. The lower portion of the recess 67 is preferably inclined, as shown in Fig. 10.

68, indicates a boss, preferably formed integral with the link 66, to which boss is attached a connecting rod 69, which at its upper end is connected to a lever 70 mounted upon a cross bar 71, which is suitably pivoted in the forward ends of the rockers 14, as best shown in Fig. 2.

72, indicates a lever, mounted upon the outer end of the cross bar 71, as best shown in Fig. 1. By this construction, by operating the lever 72, the lever 70 may be raised, thereby raising the link 66 and throwing the teeth of the rack 63 out of engagement with the pin 64. The link is of such length that when raised to its uppermost point it will lift the teeth of the rack clear of the pin 64, and thereby permit the rack to be moved over said pin. When the link is lowered, the pin 64 will engage one of the teeth of the rack 63 and lock the foot rest in the position in which it happens to be. By this construction, any desired adjustment of the foot rest may be secured.

73, indicates a foot board, which is pivotally mounted between a supporting frame 74. The forward portions of the frame 74 are connected by the foot board 73, and the rear portions by a cross bar 75, as best shown in Fig. 1. The frame 74 is of such width that it will fit over the foot rest 56.

76, indicates lugs formed on the side pieces of the frame 74, each of which lugs is provided with an inwardly projecting pin. The upper edge of each of the side pieces of the frame 56 of the foot rest is provided with notches 77, as best shown in Fig. 1, which notches are adapted to receive the pins carried by the lugs 76 of the frame 74. By this construction, by fitting the pins carried by the lugs 76 into the notches 77 on opposite sides of the foot rest, the weight of the foot board will cause the cross bar 75 to bear against the under side of the frame 56. The foot board will thereby be held firmly in position. When it is desired to adjust the height of the foot board, by lifting the foot board the frame 74 may be moved up or down upon the footrest frame 56, and any adjustment desired thereby secured.

78, indicates stirrups, which are formed of suitable shape to receive a foot, two of which stirrups are provided, one at each side of the chair. Each stirrup is provided with a bar 79, serrated or notched on its under edge, as best shown in Fig. 1. The bar 79 of each stirrup is adapted to fit into a suitable channel formed in the seat of the chair.

In order to prevent the chair seat from wearing away, and to remove the strain of the stirrups from the chair seat, a plate 80 is provided, which is formed integral with the bracket 60 at each side of the chair. The plate 80 is provided with a slot 81, adapted to receive the rod 79. The serrations of the bar 79 are adapted to fit upon the edge of the slot 81 in such manner that when the stirrups 78 are pressed downward and forward the serrations will engage the edge of the slot and the stirrups will be firmly held in position. By lifting the stirrups 78 they may be moved in or out, as desired. The stirrups also serve to lock the chair seat upon its support, because of the fact that the plates 80 are secured to the frame of the chair.

82, indicates a head rest, which is mounted upon a plate 83, as best shown in Fig. 20. The plate 83 is pivotally mounted upon the upper ends of two parallel rods 84 and 85. The upper ends of the rods 84 and 85 are bent at right angles, as shown in Fig. 19, and the two rods are so mounted in their bearings in the plate 83 that they may be moved past each other, as shown in Fig. 19, and they are pivoted to the plate 83 at different points as shown in Fig. 20.

86, indicates a clamp for supporting the rods 84 and 85. The clamp 86 consists of two disks 87 and 88, which are provided on the inside with recesses 89 and 90 respectively, as best shown in Fig. 21.

91 and 92 indicate recesses formed in the disks 87 and 88, each disk being provided with two recesses, at points on their peripheries which would be intersected by a chord, as shown in Fig. 22. The depth of the recesses 91 and 92 is such that when the rods 84 and 85 are fitted into them they will project slightly beyond the inner surfaces of the disks, as best shown in Fig. 21. Each disk is provided with an offset, 93 and 94, which offsets engage each other and serve as stops to limit the motion of the disks.

95, 96, indicate disks, which are located upon the outer surface of the disks 88 and 87 respectively, as best shown in Fig. 21, to which are attached plates 101, 102, adapted to be secured to the chair frame.

97, indicates a bolt, provided with a head 98, which bolt extends centrally through the disks 87, 88, 95, 96, as best shown in Fig. 21. The head 98 of the bolt 97 is locked to the disk 95 by means of a pin 103, which is rigidly secured to the disk 95, and which fits into one of a series of notches 104 formed around the periphery of the head 98 of the nut 97.

99, indicates a lever, provided with a screw-threaded boss 100, which is adapted to screw upon the end of the bolt 97. By this construction, by operating the lever 99, the disks 87 and 88 may be made to approach each other or to recede from each other. When the boss 100 is screwed upon the bolt 97, the disks 87 and 88 are drawn together, thereby firmly binding the rods 84 and 85 between the inner surfaces of the disks 87 and 88, and securely locking them in position. By this construction any desired vertical adjustment of the head rest may be made.

If it is desired to throw the head rest rearward from the back of the chair, the rods 84 and 85 may be withdrawn from the clamp 86 and reversed, the rod 84 being placed in front of the rod 85, as shown in Fig. 1, and by this arrangement the head rest will be thrown to the rear, owing to the mounting of the plate 83 upon the rods 84 and 85. By removing the boss 100 from the bolt 97, the position of the head 98 with regard to the disk 95 may be adjusted and the position of the lever 99 thereby altered as may be necessary.

The tubular shaft 3 upon which the revolving frame 2 is mounted, as illustrated is provided with a pin at its upper end, but it may be closed, or provided with an internal flange. It is fitted in a sleeve 105, which forms the center or core of the lower portion of the chair support or base. The sleeve 105 is wholly or partially closed at its lower end, and is provided at suitable points on its exterior surface with flanges or projections to which the legs 106 of the chair may be attached. The legs 106 may be of any convenient number, and are preferably mounted on casters 107, in the usual manner.

The sleeve 105 is composed of two semi-cylindrical sections, which are provided at opposite points near their ends with bosses or rings 108, 109, adapted to receive bolts 110, 111, by means of which the sections of the sleeve may be secured together. The sections of the sleeve 105 are so constructed that when their back edges are closely united by means of the bolts 111 in the bosses 109, there will remain a narrow perpendicular slot 112 extending from the top almost the length of the sleeve on the opposite side, and between the bosses 108 and 109, as best shown in Fig. 3. The shaft 3 is adapted to slide vertically in the sleeve 105, which at its upper end fits the shaft closely.

113, indicates a counterbalancing spring, which is supported in the sleeve 105 and extends into the shaft 3, and bears upon a cap secured in the upper end of the shaft 3, or is secured in any other suitable manner. Within the spring 113 at its lower end is a perpendicular rod 114, which is fixed to the bottom of the sleeve 105 and projects centrally upward a short distance, to add additional support to the spring 113. The tension of the spring 113 is such that while it will permit of the shaft 3 being easily pushed down to its lowermost point, it will entirely or almost entirely overcome the weight of the chair and supporting frames.

150, indicates a narrow collar, which is firmly secured on the lower end of the shaft 3.

In one side of one of the sections of the sleeve 105 is a vertical slot which extends upward from a point near the bottom of the sleeve 105, to about two thirds the length of the sleeve, and is adapted to receive the edge of a narrow bar 115, which is provided on its inner edge with notches 116, as best shown in Fig. 4. The notched bar 115 is supported in place by the bottom and sides of the slot in which it rests, and is provided, preferably at or near its center, with a spring or springs 117, one on each side of the bar 115, which springs are secured to the sleeve 105 in any suitable manner and are attached at their free ends to the notched bar 115, in such manner that they will be adapted by their tension to throw the bar 115 outward from the slot in the sleeve in which it is fitted. The bar 115 is provided on its outer edge with projections, 118, 119, which are upwardly and outwardly inclined or beveled on their lower edges, and preferably have squared upper edges.

120, indicates a foot lever, having outwardly extending arms 121, 122, which is pivotally mounted on the sleeve 105 by means of a curved arm 123, which extends around the side of the sleeve 105 opposite to the bar 115, and is pivoted on the lower end of the sleeve 105, the pivots being on opposite sides of the sleeve and in a line at right angles to the slot in the sleeve 105 in which is fitted the bar 115, as best shown in Fig. 5.

124, indicates a horizontal curved arm, rigidly secured to the lever 120, and which is preferably made a part thereof, which connects the lever 120 with a bar 125, to which it is pivotally attached at 126.

127, indicates a coiled spring, which is mounted on the lower portion of the sleeve 105 and has a projecting arm 128 which is connected to the arm 124 in any suitable manner, and is adapted to hold the arm 124 in its raised or horizontal position, as best shown in Figs. 5 and 6. The bar 125 to which the lever arm 124 is connected, may be made of any suitable material, and is preferably of the thickness of the bar 115 on the outer edge of which it is adapted to slide. The inner edge of the bar 125 is recessed or indented to correspond with the projections 118, 119 on the outer edge of the bar 115, so that the indentations on the bar 125 will be adapted to receive the projections 118, 119, on the bar 115. The bar 125 is so arranged that when the lever 120 and the arm 124 are in a horizontal position, the indentations in the inner edge of the bar 125 will be above the projections 118, 119, on the bar 115, so that the inner edges of the bar 125 will rest upon the projections 118, 119. The bar 125 will therefore hold the bar 115 at its innermost point, as best shown in Fig. 4. By pressing down the arm 122 of the foot lever 120 the bar 125 will be drawn downward until its indentations are opposite the projections 118, 119. The spring or springs 117 will then act to throw the rod 115 outward, its projections 118, 119 fitting into the indentations in the bar 125. The collar 150 on the shaft 3 of the chair support will thereby be disengaged from the notch 116 in which it is engaged, permitting the shaft 3 and the chair support to be moved upward or downward as desired. To lock the shaft 3 at any desired height, the arm 122 of the foot lever 120 is released, when it is thrown back to a horizontal position by the spring 127. The bar 125 will thereby be forced upward, the inclined ends of the notches on its inner surface sliding upward over the lower inclined edges of the projections 118, 119, on the bar 115, overcoming the tension of the spring or springs 117 and forcing the bar 115 to move inward, so that the collar 150 will engage one of the notches 116. The collar 150 may be made to engage one of the notches 116 by moving the shaft 3 slightly up or down. The notches 116 may be placed as near together and may be as numerous as desired, so that the shaft 3 may be locked at any height.

The bar 125 is provided at its upper end with an inward extension 129, the inner edge of which extends to the sleeve 105 and is adapted to slide thereon.

130 indicates a lug or projection formed on the side of the sleeve 105, as best shown in Fig. 6, which is adapted to act as a guide for the bar 125 and extension 129.

131, indicates a lever curved to correspond with the surface of the sleeve 105, which lever 131 is pivoted on the bolt 110 which unites the bosses 108, 109 on the upper part of the sleeve 105. The adjacent edges of the boss 108 and the lever 131 are correspondingly serrated or provided with ratchet teeth, which are so arranged as to allow the lever 131 to move or rock upward. The bolt 110 is so adjusted as to hold the teeth of the boss 108 and lever 131 in engagement with each other, as best shown in Fig. 7. The outer or free end of the lever 131 is adapted to extend into a depression or hole 132 in the projection 129 on the bar 125. Below the hole or depression 132 is a flat cross bar 133, which extends from the projection 129 to the sleeve 105, and is preferably slightly below the level of the projection 129. The lever 131 is adapted to rest upon the upper edge of the bar 133, when the bar 125 is in either its intermediate or norma position, or its lowered position. When the bar 125 is forced upward into the position shown in Fig. 8, and indicated by dotted lines in Fig. 3, by pressing downward on the arm 121 of the foot lever 120, Fig. 5, which throws the arm 124 upward, the outer end of the lever 131 will slide over the upper edge of the bar 133, and will rest on its flat surface. When the parts are in this position the lever 131 will have a tendency to move downward under the pressure of the cam faces of the ratchet teeth on said lever and the boss 108, caused by the expansive force of the sleeve 105 and will frictionally engage the bar 133 in such manner as to bind the bar 125 in position. By a downward pressure on the arm 122 of the foot-lever 120, the bar 125 may be moved downward again. When the lever 131 is rocked upward, the incline of the teeth on its inner edge will cause an inward pressure on the boss 108 sufficient to partially or completely close the slot 112 in the sleeve 105, as best shown in Fig. 8, which will so lessen the size of the sleeve 105 as to cause it to clamp the shaft 3 at whatever point of its rotation it happens to be. The rotation of the shaft 3 will thereby be prevented. The end of the lever 131 may be released from its position on the bar 133, and returned to its position in the hole 132 by pressing the arm 122 of the lever 120, which will draw the bar 125 and extension 129 downward, when the lever 131 will be returned to the hole 132 under the expansive force of the sleeve 105.

That which I claim as my invention, and desire to secure by Letters Patent, is—

1. The combination with a slotted sleeve open at the top and composed of two sections, and supporting devices therefor, of bosses 108, 109, for uniting said sections, the boss 108 being notched or toothed on its outer edge, bolts 110, 111, uniting said sections, and a shaft adapted to rotate in said sleeve, of a lever pivoted on the bolt 110 and provided with notches or teeth adjacent to the teeth on the boss 108 and adapted to move on the notches or teeth on said boss to contract the slot, a foot lever and mechanism for raising the end of said first named lever through said foot lever, substantially as and for the purpose specified.

2. In an adjustable chair, the combination with a supporting base and a shaft 3, of a frame 2, mounted on said shaft, and having tongues 7 and eyes 8, of transverse bars 5, having socket 9 and pin 11, and links 6 pivotally attached to the frame 2 and the transverse bars 5, and adapted to permit of an angular adjustment of the transverse bars 5 with reference to the frame 2, substantially as and for the purpose specified.

3. In an adjustable chair, the combination with a stationary slotted sleeve, of a shaft adapted to move vertically in said sleeve, a supporting frame, supported by said shaft a collar encircling the lower end of said shaft and secured thereto, a bar 115 fitted into the slot in the said sleeve, having notches 116 on its inner edge adapted to receive and hold the edge of the collar, springs connected with said notched bar 115 adapted to retain it normally out of engagement with the collar on the vertically movable shaft, and a vertically slidable bar 125, in operative relation to the notched bar 115 and adapted to force said notched bar 115 into engagement with the collar on the vertically movable shaft against the tension of the springs, and means for operating said bar 125, substantially as described.

4. In an adjustable chair base, the combination with a sleeve, legs or supports therefor, a shaft adapted to move vertically in the sleeve, a supporting frame supported by said shaft and a collar encircling the lower end of said shaft and secured thereto, of a bar 115 fitted into a slot in the sleeve, having notches 116 on its inner edge adapted to receive and hold the edge of the collar, and projections 118, 119 on its outer edge, springs 117 adapted to throw the bar 115 outward, a bar 125 adapted to slide on the outer edge of the bar 115 and provided on its inner edge with indentations to correspond with the projections on the bar 115, and a lever adapted to draw the bar 125 downward, substantially as and for the purpose specified.

5. In an adjustable chair, the combination with a sleeve 105 provided with a slot 112, bosses 108, 109, bolt 110 and lever 131, said boss 108 and lever 131 having opposite cam faces, legs or supports 106, and a shaft adapted to move vertically in and fitting closely the sleeve 105, of a bar 125 having an inward extension 129 at its upper end, said extension having a hole 132 adapted to receive the end of the lever 131, a bar 133 adapted to be engaged by said lever when the bar 125 is moved upward, a lever 120 connected to the bar 125 and means for exerting an upward pressure thereon, substantially as described.

6. The combination with a fixed horizontal base 2, and supporting devices therefor, of side bars 4 transverse bars 5 connecting said side bars one of which is provided with a bolt hole, a projection extending from said base and provided with a series of bolt-holes, and a bolt adapted to engage the bolt hole in the transverse bar 5, and a bolt hole in the said projection, and links 6, pivotally connecting said transverse bars 5 and stationary base 2 substantially as described.

7. The combination with a fixed horizontal base 2, and supporting devices therefor, of side bars 4, transverse bars 5 connecting said side bars, links 6 pivotally connecting said transverse bars and said fixed base 2, and means for locking said side bars with relation to said base, substantially as described.

8. In a chair seat, the combination with a sleeve made in sections or halves, and a shaft vertically movable therein, of a boss 108 having teeth or inclines at its back, a boss 109, a lever 131 having corresponding teeth or inclines for clamping and locking the adjustable shaft 3, a vertically movable bar 125, adapted to engage the lever 131, to lock and unlock the sleeve upon the shaft, and means for operating said bar 125, substantially as described.

9. In a chair the combination with a frame, and a vertically adjustable support therefor, of mechanism for locking said support in its adjusted position consisting of a slotted sleeve, provided with bosses one of which is provided with teeth or inclines, bolts connecting said bosses, a lever 131 having teeth or inclines adapted to engage the teeth or inclines of said toothed or inclined boss, a rocking lever 120 having arms 121, 122, on opposite sides of its pivot, a sliding bar 125, adapted to engage the lever 131, an arm 124 connected with said bar 125 and lever 120 and a spring 127 connected with said arm 124 and said slotted sleeve, substantially as described.

10. The combination with the frame of a chair seat, and a foot rest pivotally mounted at the forward portion thereof, of a rack 63 pivotally connected at its forward end to said foot rest and extending rearward under a portion of the chair frame, bracket 65 depending from the front portion of the chair frame, pin 64 carried by said bracket and adapted to engage the notches in said rack, a link 66, having a recess 67, said link being fitted upon said pin 64, levers 70 and 72, and a connecting rod 69 connecting said link with the lever 70, substantially as described.

11. The combination with a chair body, of brackets 60 carried thereby and provided with open top sockets 59 and flanges 61, a frame adapted to fit between said brackets, pivots 58 carried by said frame and adapted to fit into said sockets, and lugs 62 carried by said frame and located a short distance from said pivots to permit the flanges 61 to pass between said pivots 58 and lugs 62, substantially as described.

12. The combination with a head rest, and rods 84 and 85 pivotally connected at their upper ends to said head rest, of disks 87 and 88, having recesses 91 and 92 adapted to receive said rods 84 and 85, brackets 101, 102, having disks 95 and 96 for securing them to said disks 87 and 88, bolt 97 passing centrally through said disks, having a head 98, notches 104 in said head, pin 103 in the disk 95, adapted to engage the notches in the head 98, lever 99 adapted to screw upon the end of said bolt 97, substantially as and for the purpose specified.

WILLIAM H. FAUBER.

Witnesses:
 JOHN L. JACKSON,
 RALPH VANDYKE.